Figure 1:
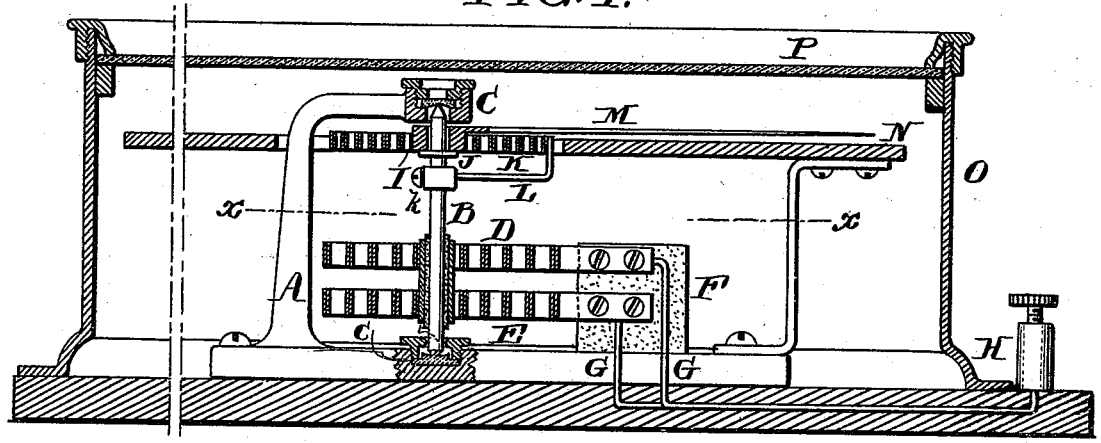

(No Model.)

O. T. LOUIS.
ELECTRICAL MEASURING INSTRUMENT.

No. 510,074. Patented Dec. 5, 1893.

WITNESSES:
Henry Drury
H. L. Motherwell

INVENTOR:
Otto T. Louis
By his atty

THE NATIONAL LITHOGRAPHING COMPANY,
WASHINGTON, D. C.

UNITED STATES PATENT OFFICE.

OTTO T. LOUIS, OF PHILADELPHIA, PENNSYLVANIA.

ELECTRICAL MEASURING-INSTRUMENT.

SPECIFICATION forming part of Letters Patent No. 510,074, dated December 5, 1893.

Application filed March 28, 1893. Serial No. 468,013. (No model.)

*To all whom it may concern:*

Be it known that I, OTTO T. LOUIS, of the city and county of Philadelphia and State of Pennsylvania, have invented an Improvement in Electrical Measuring-Instruments, of which the following is a specification.

My invention has reference to electrical measuring instruments, and consists of certain improvements which are fully set forth in the following specification and shown in the accompanying drawings which form a part thereof.

My invention comprehends the construction of an instrument adapted to measure electric currents, either as to volts or ampères, whose action depends upon the expansion of a conductor due to its being heated by the passage of an electric current.

In carrying out my invention I employ a pivoted pointer adapted to traverse a scale upon a dial plate, and combine therewith, two or more springs, preferably coiled in the same plane and similar to an Archimedean spiral. The said springs may be of one or more metals, alloys, or combinations of metals. The inner ends of two of the spiral springs are connected with the pivot shaft of the pointer, and the outer ends are secured to the terminals of the measuring instrument. A current is passed through one spiral spring and out through the other, causing the said spiral springs to coil or uncoil themselves according to the construction, and thereby move the pointer over the scale upon the dial plate. To render the instrument self-compensating, I provide a third spring of the character of the two first mentioned springs, and this third spiral spring has one end secured directly to the pointer which is loosely pivoted upon its pivot shaft, and the other end to an arm directly connected with the pivot shaft. The co-efficient of expansion of all the several springs may be such, that for whatever rotation the pivot shaft is given due to ordinary variations in atmospheric temperature, a similar movement in the opposite direction is given to the needle or pointer through the agency of the third spring; the instrument thereby becomes absolutely self compensating. An instrument of this class is excellently adapted as an ampère meter where large currents are to be measured, as the springs may be made flat with a large sectional area without impairing their resiliency, and producing two very important advantages, one being to enable them to be quickly heated, and the other to quickly change in temperature due to the possibility of quickly cooling upon the cessation or reduction of the current, thereby making the instrument exceedingly sensitive and at the same time devoid of all complication or structures which are liable to get out of order. The instrument moreover is devoid of magnets of any kind and is therefore adapted to be taken in close proximity to powerful dynamos or other instruments producing a field of force without the least danger of losing its delicacy and accuracy.

Figure 2:
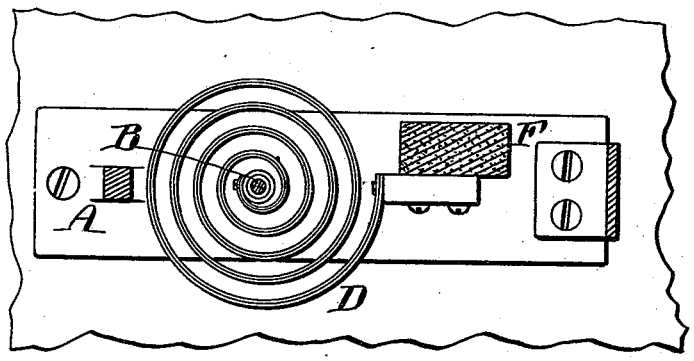
Figure 3:
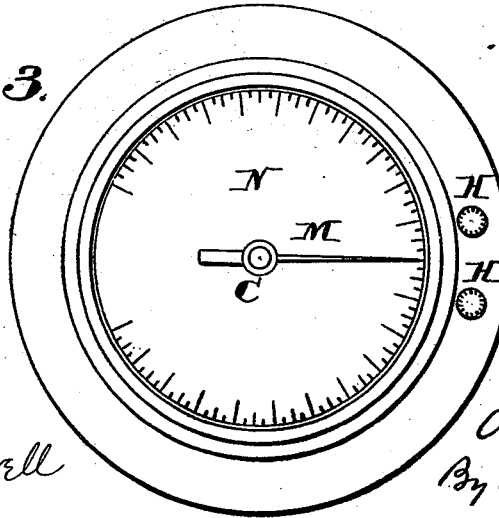

Referring to the drawings: Figure 1 is a sectional elevation of a measuring instrument embodying my improvements. Fig. 2 is a sectional plan view of a portion of same on line $x$—$x$; and Fig. 3 is a plan view of the complete measuring instrument.

A is a frame of any suitable construction carrying the two pivots C, C, which may be jeweled if so desired and of any of the well known constructions for delicate pivoting of moving parts.

B is the pointer pivot shaft and is pivoted in the bearings C, C, so as to be capable of movement with the least possible friction.

M is the pointer and is loosely pivoted to the shaft B and supported upon a collar J thereon.

K is a spiral spring having its inner end connected to the pointer M and its outer end to the arm L adjustably clamped to the shaft B at $k$. This provision for adjustment allows the pointer M to be properly adjusted to zero when no current is passing.

N is the dial plate having a scale over which the pointer moves.

D and E are two spiral springs having their inner ends secured to the shaft B and their outer ends to the insulating block F, and said ends are connected by suitable conductors G to the binding posts or terminals H, H.

O is an inclosing case of any suitable description and may be provided with a glass P to keep out dust and dirt, and prevents accidental injury to the instrument. The springs D and E are spirals preferably formed of a long strip of metal rectangular in cross section with a relatively small transverse section as compared with its depth. This strip of metal is preferably formed of two different metals having different co-efficients of expansion and united in any suitable manner, but preferably during the process of manufacture of the sheet from which this strip is cut. These two metals may be brazed, soldered, welded, or riveted together in any suitable manner as is well known in the art.

It is immaterial to my invention whether the metals are so disposed in the spiral spring as to cause the shaft B to be rotated to the right or to the left, as the scale may be properly marked. If the metal having the greatest co-efficiency of expansion be upon the inner surface of the spring the spring will tend to unwind itself upon the passage of the current, whereas if the said metal be upon the outer surface of the spring, the spring will tend to coil itself to a greater extent. In both of these cases the principle of the invention would be the same, but in the one case the pointer would move in the opposite direction to the other. It is also evident that in place of making the springs D and E of two metals secured together in the manner stated, they may be formed of any single metal or of any suitable alloy as the tendency in any spiral is to cause its inner end to move in a circle upon the passage of a current through it.

The spring K may have exactly the same construction as the springs D and E, and all that has been stated with respect to the springs D and E may apply equally to this spring K.

It is evident that while it is most desirable to make the springs D and E the same in all material respects, it does not follow that the spring K should be made the same, as in this case it may be found in practice, more desirable to use a shorter spring having a greater field of action, that is to say, it may be so constructed that for the same change of surrounding temperature, its coiling or uncoiling tendency may be greater per linear unit of its length; this would have the advantage of permitting a more stable connection between the pointer and the shaft, and yet make it positive in its adjustment to compensate for variations in the surrounding temperature.

I do not confine myself to the minor details of construction as they may be modified in various ways without departing from the invention.

What I claim as new, and desire to secure by Letters Patent, is—

1. In an instrument for measuring electric currents, the combination of a pivot shaft, two spiral springs having their inner ends connected to the shaft and their outer ends supported against rotation and connected with terminals, and a pointer carried by the said pivot shaft.

2. In an instrument for measuring electric currents, the combination of a pivot shaft, two spiral springs having their inner ends connected to the shaft and their outer ends supported against rotation and connected with terminals, a pointer carried by the said pivot shaft with provision for independent movement, and compensating devices interposed between the pointer and the pivot shaft to move the pointer upon the shaft to compensate for movements of the shaft for surrounding atmospheric changes in temperature.

3. In an instrument for measuring electric currents, the combination of a pivot shaft, two spiral springs having their inner ends connected to the shaft and their outer ends supported against rotation and connected with terminals, a pointer carried by the said pivot shaft with provision for independent movement, and compensating devices interposed between the pointer and the pivot shaft to move the pointer upon the shaft to compensate for movements of the shaft for surrounding atmospheric changes in temperature, consisting of a spiral spring having one end connected with the pointer and the other end connected with the pivot shaft.

4. In an instrument for measuring electric currents, the combination of a pivot shaft, two spiral springs having their inner ends connected to the shaft and their outer ends supported against rotation and connected with terminals a pointer carried by the said pivot shaft with provision for independent movement, compensating devices interposed between the pointer and the pivot shaft to move the pointer upon the shaft to compensate for movements of the shaft for surrounding atmospheric changes in temperature, consisting of a spiral spring having one end connected with the pointer and the other end connected with the pivot shaft, and means to adjust the pointer and its compensating spring upon the pivot shaft.

5. In an instrument for measuring electric currents, the combination of a pivot shaft, a pointer moved by said shaft, two spiral springs each formed of two metals united so as to impart to the opposite faces different co-efficients of expansion and in which the inner ends of said springs are connected with the pivot shaft and the outer ends thereof electrically connected with the terminals or binding posts.

6. In an instrument for measuring electric currents, the combination of a pivot shaft, a pointer moved by said shaft, two spiral springs each formed of two metals united so as to impart to the opposite faces different co-efficients of expansion and in which the inner ends of said springs are connected with the pivot shaft and the outer ends thereof electrically connected with the terminals or binding posts with provision for independent movement, and compensating devices interposed between the pointer and the pivot shaft to move the pointer upon the shaft to compensate for movements of the shaft for surrounding atmospheric changes in temperature.

7. In an instrument for measuring electric currents, the combination of a pivot shaft, a pointer moved by said shaft, two spiral springs each formed of two metals united so as to impart to the opposite faces different co-efficients of expansion and in which the inner ends of said springs are connected with the pivot shaft and the outer ends thereof electrically connected with the terminals or binding posts, and compensating devices interposed between the pointer and pivot shaft consisting of a spiral spring having one end connected with the pointer and the other end connected with the pivot shaft.

8. In an instrument for measuring electric currents, the combination of a pivot shaft, a pointer moved by said shaft, two spiral springs each formed of two metals united so as to impart to the opposite faces different co-efficients of expansion and in which the inner ends of said springs are connected with the pivot shaft and the outer ends thereof electrically connected with the terminals or binding posts, compensating devices interposed between the pointer and pivot shaft consisting of a spiral spring having one end connected with the pointer and the other end connected with the pivot shaft and means to adjust the pointer and its compensating spring upon the pivot shaft.

In testimony of which invention I have hereunto set my hand.

OTTO T. LOUIS.

Witnesses:
ERNEST HOWARD HUNTER,
HELEN L. MOTHERWELL.